(12) United States Patent
Leake et al.

(10) Patent No.: US 8,202,161 B2
(45) Date of Patent: Jun. 19, 2012

(54) VIRTUAL GAME INSTRUCTOR

(75) Inventors: Brian Leake, Los Angeles, CA (US);
Chang Hoh Koo, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 286 days.

(21) Appl. No.: 12/604,884

(22) Filed: Oct. 23, 2009

(65) Prior Publication Data

US 2011/0098109 A1   Apr. 28, 2011

(51) Int. Cl.
*G06F 17/00* (2006.01)
(52) U.S. Cl. .......................................................... 463/30
(58) Field of Classification Search .............. 463/30–33, 463/16, 20, 25; 705/1
See application file for complete search history.

(56) References Cited

U.S. PATENT DOCUMENTS

| | | | | |
|---|---|---|---|---|
| 2010/0154266 | A1* | 6/2010 | Vincent | 40/711 |
| 2010/0277470 | A1* | 11/2010 | Margolis | 345/419 |
| 2010/0302257 | A1* | 12/2010 | Perez et al. | 345/474 |

* cited by examiner

*Primary Examiner* — Ronald Laneau
(74) *Attorney, Agent, or Firm* — Ference & Associates LLC (57) ABSTRACT

Embodiments of the invention provide a virtual game instructor. According to various embodiments of the invention, the virtual game instructor is configured to provide a convenient and easy to follow tutorial instruction session for completing various game movements. Embodiments of the invention provide players with the ability to accurately compare their movements in real-time with the virtual instructor, thus facilitating learning and performing even complex game moves more easily.

20 Claims, 5 Drawing Sheets

VIRTUAL GAME INSTRUCTOR

BACKGROUND

Typically in performance based video games, such as music and/or dance based video games, the player(s) must perform actions, such as playing instrument notes or performing dance moves, based upon explicit, real-time events in synchronization with a music track or some other time or motion dependent parameter(s). This can prove challenging or intimidating to the first-time or otherwise inexperienced player(s) that may be unfamiliar with the specific moves necessary in order to perform the game actions and successfully complete the piece. Moreover, conventional tutorials used in current game systems are confusing because they are limited to use of on-screen icons which do not illustrate in an easy to understand way what movements are required from the user.

BRIEF SUMMARY

Aspects of the invention broadly contemplate systems, methods and apparatuses that provide a virtual instructor rendered with (for example, alongside) the player(s) representation (for example, an avatar) on a video game screen. Embodiments of the invention provide a virtual instructor able to perform moves that clearly demonstrate the steps necessary to execute one or more specific game actions/performance.

In summary, one aspect of the invention provides a system comprising: a gaming device having one or more processors and one or more modules executable by the one or more processors, the one or more modules comprising: computer program code configured to enable receipt and storage of motion captured data relating to one or more player movements; computer program code configured to provide to a display device display instructions corresponding to one or more player avatars according to the received motion captured data relating to one or more player movements; computer program code configured to provide to the display device display instructions corresponding to one or more virtual instructors; and computer program code configured to compare the motion captured data relating to one or more player movements to one or more virtual instructor movements.

Another aspect of the invention provides an apparatus comprising: one or more processors; and one or more computer readable storage mediums having computer program instructions embodied therewith, the computer program instructions being executable by the one or more processors and comprising: computer program code configured to enable receipt and storage of motion captured data relating to one or more player movements; computer program code configured to provide to a display device display instructions corresponding to one or more player avatars according to the received motion captured data relating to one or more player movements; computer program code configured to provide to the display device display instructions corresponding to one or more virtual instructors; and computer program code configured to compare the motion captured data relating to one or more player movements to one or more virtual instructor movements.

A further aspect of the invention provides a computer program product comprising: a computer readable storage medium having computer readable program code embodied therewith, the computer readable program code comprising: computer program code configured to enable receipt and storage of motion captured data relating to one or more player movements; computer program code configured to provide to a display device display instructions corresponding to one or more player avatars according to the received motion captured data relating to one or more player movements; computer program code configured to provide to the display device display instructions corresponding to one or more virtual instructors; and computer program code configured to compare the motion captured data relating to one or more player movements to one or more virtual instructor movements.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings/figures. The following description is intended only by way of example and simply illustrates certain selected presently preferred embodiments of the invention as claimed herein.

Regarding the figures, the flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The inventors have recognized that, especially in the context of dance-based video games, it is particularly challenging to convey to the player(s) how to perform dance moves without multiple play-through and repeated failure and learning over time. Conventional systems give explicit instructions to the player(s) on how to perform the dance during the live performance (game action) itself. Typically this includes icons presented as examples, the icons representing buttons to be pressed or positions in which to place feet on a dance pad peripheral device, and the like. Music games such as ROCK BAND offer a "tutorial mode" that allows the player to slow down the performance of a specific track or offers the ability to loop-and-repeat specific areas of a song in order to train the player(s) to cope with difficult sections. However, the inventors have found that the conventional arrangements fall short in several respects, including at least failing to give a natural and easy to follow visual/graphical representation as to how to perform the requisite game action(s) as an on-demand tutorial game function.

Accordingly, embodiments of the invention provide a system that clearly leads the player(s) through actual moves by way of visual (and preferably supplemented with audio) examples that help first time or otherwise inexperienced player(s) get up to speed and foster a sense of accomplishment. Embodiments of the invention provide a virtual instructor that replaces the usual arrows or button icons used by conventional game systems for instruction. Embodiments of the invention provide a virtual instructor able to teach the player(s) and lead the player(s) through the performance by way of example. According to presently preferred embodiments of the invention, a video camera and motion data capture system are utilized to provide the player(s) representation (avatar) on screen next to the virtual instructor for real-time comparison.

The description now turns to the figures and select, presently preferred embodiments of the invention will be described. The following description of various embodiments of the invention is presented to highlight certain aspects of the invention, and the scope of the claimed embodiments of the invention will be pointed out in the appended claims.

Figure 1:
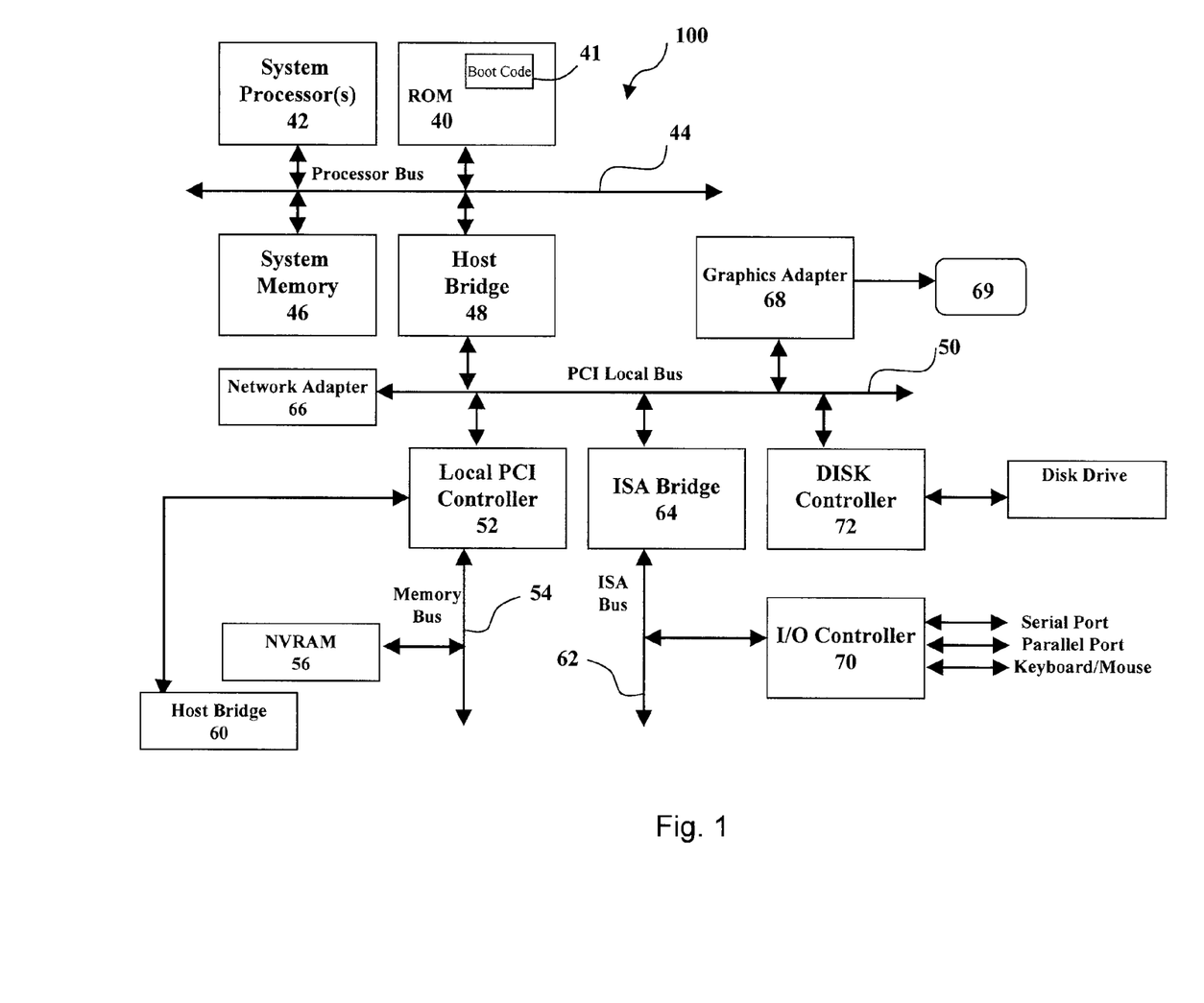
FIG. 1 illustrates a computer system according to an embodiment of the invention.

Referring now to FIG. 1, there is depicted a block diagram of an illustrative embodiment of a computer system 100. The illustrative embodiment depicted in FIG. 1 may be an electronic device such as a game console, a desktop or workstation computer, a mobile computing device and the like. As is apparent from the description, however, embodiments of the invention may be implemented in any appropriately configured electronic device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive with PCI local bus 50. The USB Bus and USB Controller (not shown) are part of the Local PCI controller (52).

Figure 2:
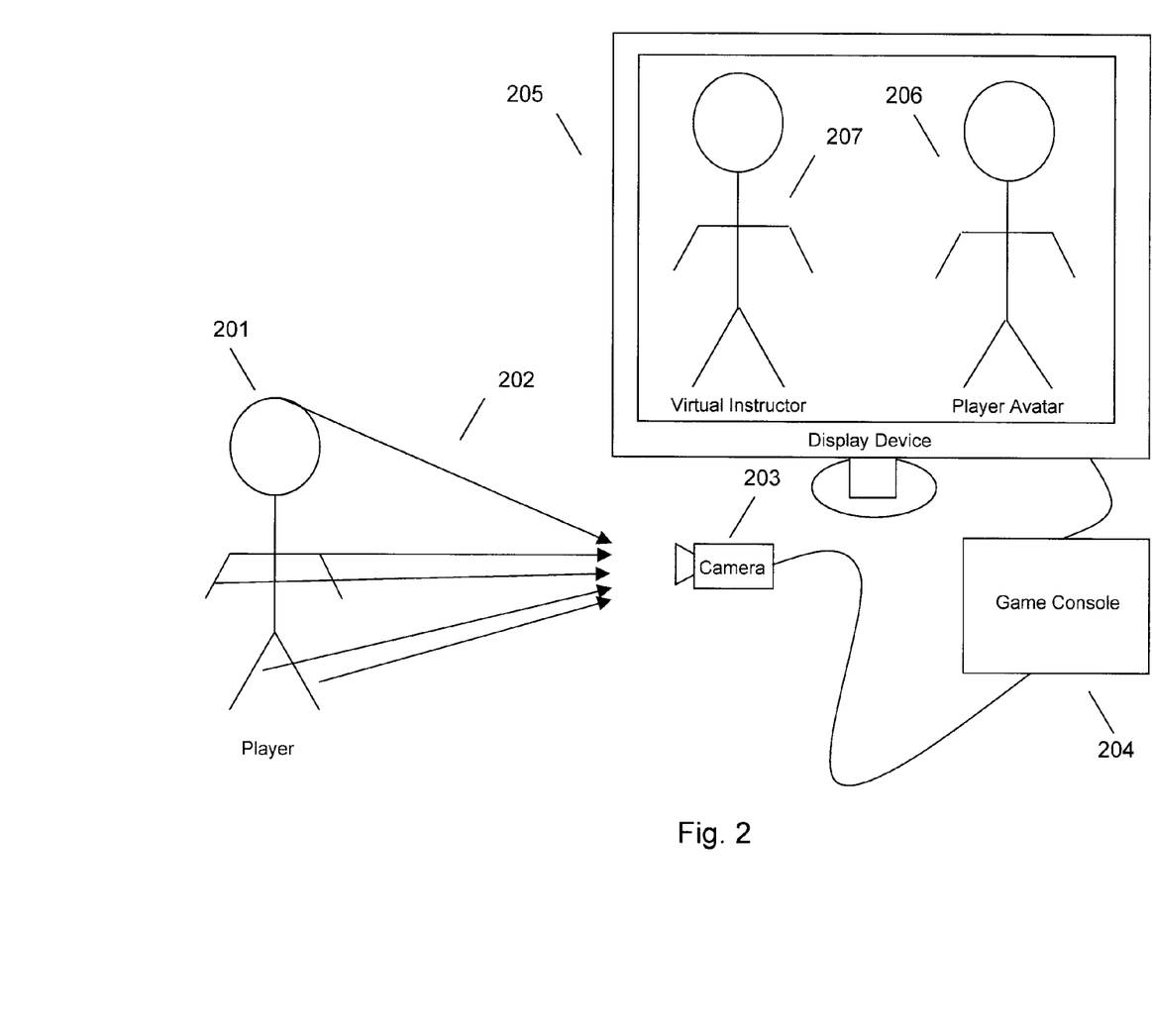
FIG. 2 illustrates a game system according to an embodiment of the invention.

Referring now to FIG. 2, a system providing a virtual instructor according to one embodiment of the invention is illustrated. As shown, a player 201 is preferably positioned appropriately such that a motion capture system can capture a plurality of player inputs 202 as the player moves about. The motion capture system preferably comprises a three-dimensional (3D) camera 203 configured to detect motion of the player using an appropriate form of detection. Those skilled in the art will recognize that there are a variety of motion detection systems suitable for providing full body motion capture. A presently preferred motion capture system is NATAL of MICROSOFT CORP. The motion capture system, which may be distributed such as between camera 203 and game console 204, transmits the motion capture data to the game console (for example, there is a pre-processor/DSP (Digital Signal Processing) unit between the camera and the console (not shown)). Connected via. USB. An appropriate buffering mechanism is employed to allow the input player motion capture data to be converted into display instructions for output to a display device 205. A presently preferred display device is a flat panel liquid crystal display (LCD) television set appropriately configured for game system (console) inputs.

The display device 205 is connected to the game console 204 via a suitable connection, for example a USB connection, which could also be a wired or wireless connection. The display device will display game actions, such as predetermined dance moves of the virtual instructor 207 and/or game actions corresponding to the player inputs 202 as detected by the motion capture system camera 203.

According to embodiments of the invention, the virtual instructor 207 is displayed along side a display of the player's avatar 206. The player's avatar may be a virtualization of the player based upon the 3D motion captured data or composited video of the player as a processed image directly from the camera. The virtual instructor 207 is pre-prepared and provided as part of the game. For example, the virtual instructor 207 may be prepared by capturing movement data from an actual instructor utilizing the motion capture system and virtualizing it, as with the player movements. Alternatively the virtual instructor could be truly virtual and programmed into the game. The virtual instructor 207 is preferably configured to lead the player through a sequence of moves required by the game. As shown, the virtual instructor 207 preferably is displayed next the player's avatar 206 so as to facilitate easy visualization by the player 201 of the required moves, as illustrated via the virtual instructor's 407 movements.

Figure 3:
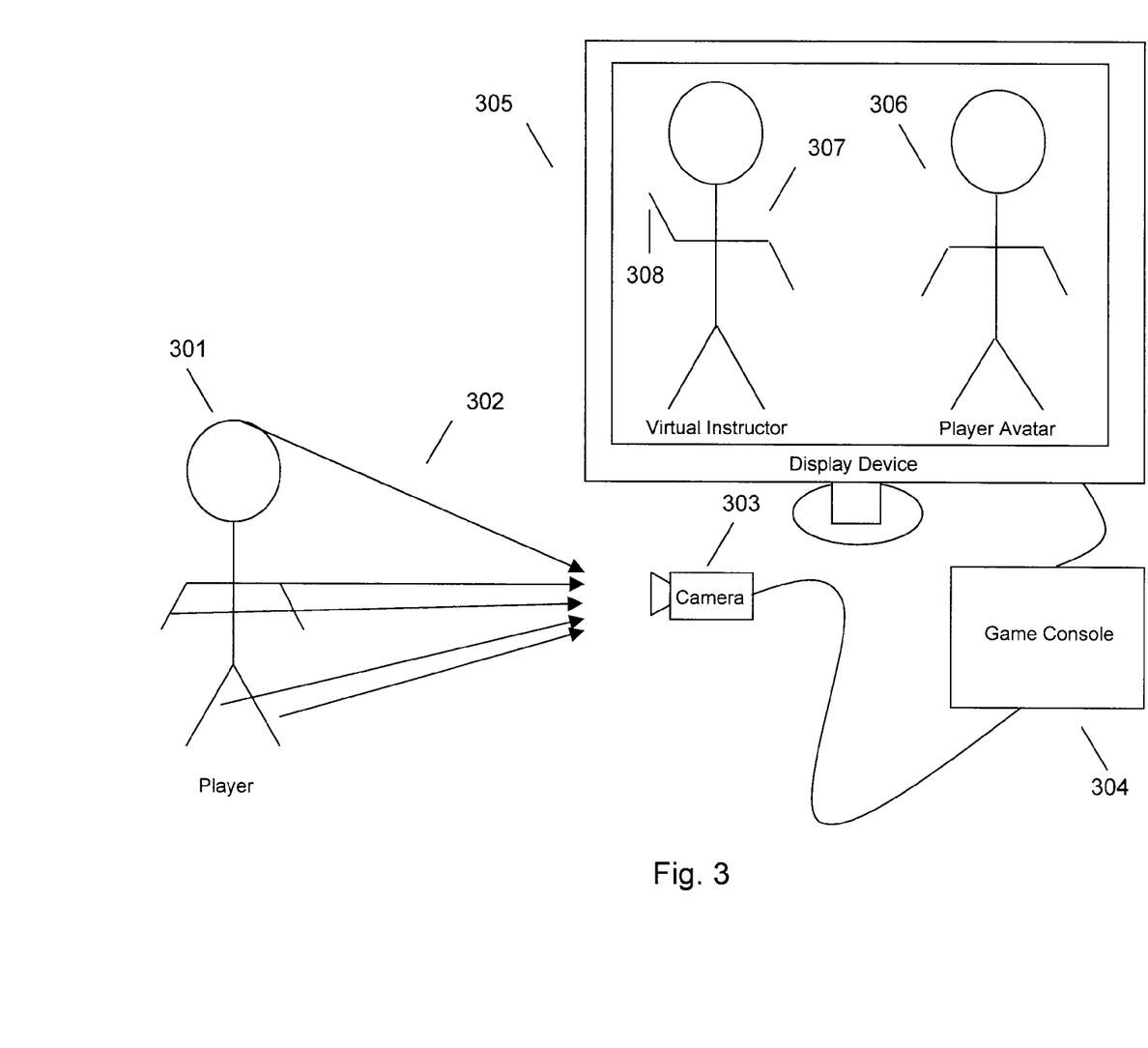
FIG. 3 illustrates a game system according to an embodiment of the invention.

Thus, FIG. 3 illustrates a game system according to one embodiment of the invention. A virtual instructor 307 is presented upon the display device, 305, again appearing next to the player's avatar 306, as produced by the player's 301 plurality of inputs 302 as detected by the camera 303 and translated by the game console 304. As indicated, the virtual instructor 307 will teach a pre-determined sequence of moves to the player 301. The pre-determined sequence of moves can preferably be predetermined and loaded as a set of instructions, such as stored in an appropriate memory or storage device (not shown) of the game console or like device, that is, as any other game function.

In FIG. 3 one such predetermined move is illustrated at 308, where it is shown that the virtual instructor's right arm is raised as a first move in the dance sequence. It will be noted that this will be an animated movement even though a course movement is portrayed in the transition between FIG. 2 and FIG. 3. It will also be appreciated that, because the player has not yet attempted to replicate the move in FIG. 3, the virtual instructor's right arm is raised at 308 whereas the player's avatar 306 has not raised the right attn. The player's avatar similarly moves in an animated fashion, as discussed further herein.

Figure 4:
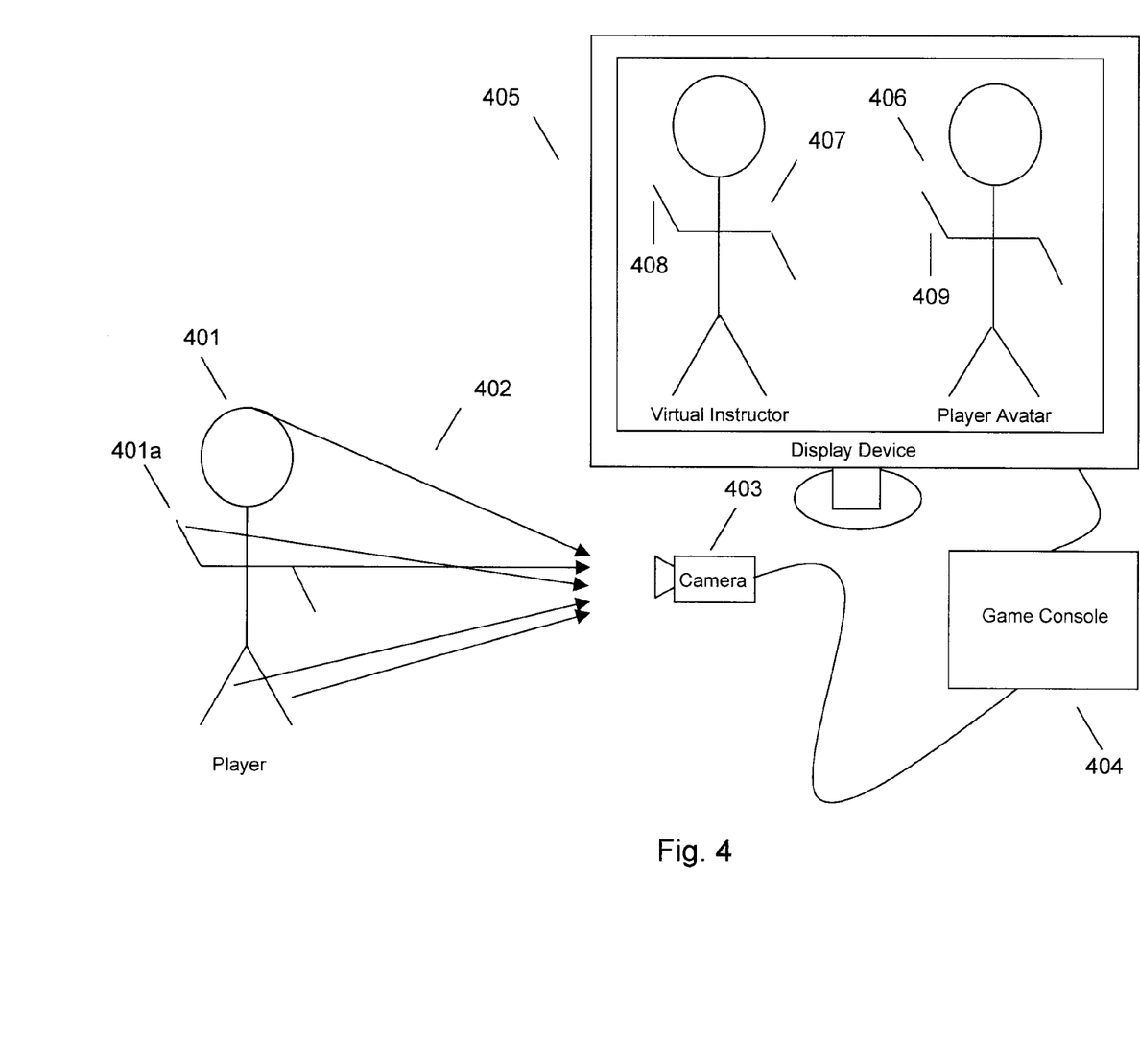
FIG. 4 illustrates a game system according to an embodiment of the invention.

FIG. 4 illustrates a game system according to an embodiment of the invention. FIG. 4 illustrates that the player, upon an attempt to mimic the virtual instructor 407, raises his or her right arm as indicated at 401a. Thus, the player 401 provides a plurality of inputs 402 corresponding to the player's current posture. These inputs 401 are again captured by the camera 403 of the motion capture system and ultimately transmitted to the game console 404, where they can be buffered and translated into display instructions for output to the display device 405. Thus, the player's avatar 406 will now represent the player's 401 movement, including the movement indicated at 401a, by indicating a raised right arm of the player's avatar 406, as indicated at 409.

Accordingly, it can be determined by the system if the player 401 has matched with sufficient accuracy the virtual instructor's 407 movement. The player can match the virtual instructor's 407 movement within, for example, a predetermined based on one or more of motion (motion based) and time (time based). If it is determined that the player's 401 movements appropriately replicate the virtual instructor's 407 movements (for example within a predetermined threshold), the virtual instructor 407 can progress to the next move. In contrast, if the player 401 fails for some reason to replicate the virtual instructor's 407 movement with sufficient accuracy (or timing, et cetera), the virtual instructor 407 can be pre-programmed to repeat the move (either at full speed or more slowly, et cetera) such that the player 401 can once again practice performing the move. It should be noted again that throughout this description only certain examples are discussed fully, while many more options are available according to embodiments of the invention. For example, rather than merely repeating the move, the virtual instructor 407 may offer an easier, alternative move to ease the player 401 into the experience.

Figure 5:
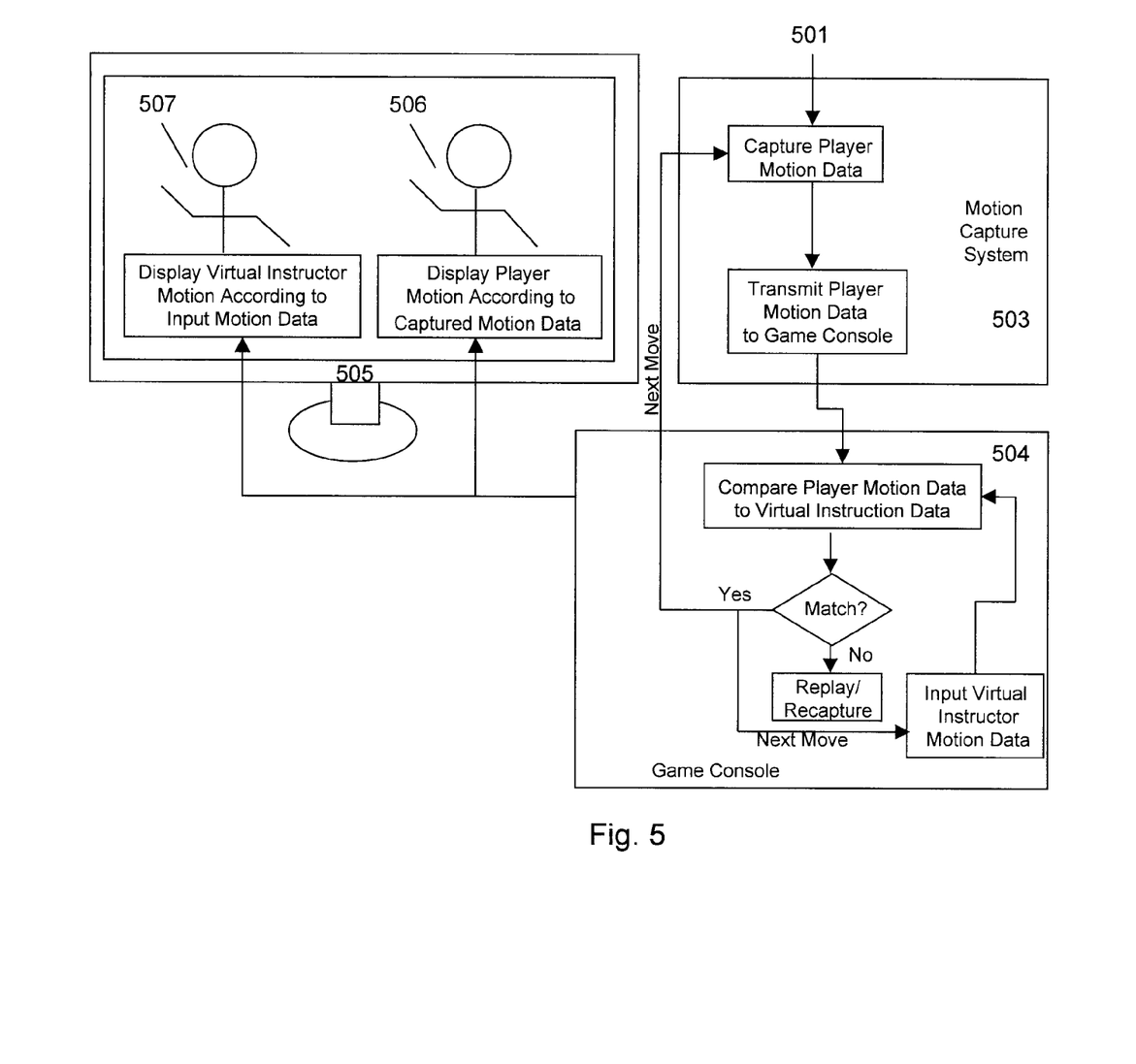
FIG. 5 illustrates a game system according to an embodiment of the invention.

Referring to FIG. 5, an overall flow of the tutorial program according to an embodiment of the invention is illustrated. Again, both the player's avatar 506 and the virtual instructor 507 are represented on the display device 505. While any number of suitable locations can be chosen for the virtual instructor 507 and the player's avatar 506, it has been discovered that it is particularly helpful if the virtual instructor 507 is displayed immediately adjacent to the player's avatar 506 on the display device 505, which approximates in the virtual environment the scenario where a dance instructor and student stand side by side and study one another's movements in front of a mirror.

As discussed herein, the virtual instructor 507 will begin a motion or a game move, for example a dance move or the like, which can be selected from a pre-prepared set of instructions configured to display the virtual instructor 507 indicating moves for the tutorial session, available in the game console or like device. The virtual instructor 507 first moves in order to demonstrate to the player how, in a realistic yet virtualized representation, the player is to move. The virtual instructor 507 is thus displayed on the display device 505 as a visual guide.

The player 501 then begins his or her movements in an attempt to mimic the instructor 507. These movements will be captured as a plurality of data inputs by the motion capture system 503. The motion capture system 503 transmits the captured motion data of the player to the game console 504. The game console 504 outputs instructions configured to display the player's motions on the display screen 505 as the player's avatar 506, again preferably beside the virtual instructor 507. It will be recognized by those having ordinary skill in the art that the player's movement(s), as represented by the player's avatar 506 on screen 505, can be transmitted for real-time display on the display device 505. Thus, the player 501 is enabled to dance along with the virtual instructor 507, either following the virtual instructor's lead or substantially simultaneously, using the player avatar 506 to compare the dance movements with the virtual instructor 507. Also, the real-time system enables the player 501 to actually use the virtual instructor 507 as a dance partner, either for practice (that is, within the tutorial) or during actual game play.

The game console 504 is also configured with appropriate logic to compare the player motion data captured by the motion capture system 503 to the pre-prepared virtual instructor movements (that is, the ideal motion data for performing the game move, dance move, et cetera). If the player's motion captured data matches the virtual instructor's motion data to a predetermined threshold, the virtual instructor 507 can progress to teach another game move (or if during actual play, the dance can continue). However, if it is determined that the player's motion captured data does not match the virtual instructor's motion data to the predetermined threshold, the system can repeat the move (or similar dependent, predetermined action), wherein the virtual instructor 507 can repeat the move such that the player 501 can again attempt to mimic it.

It should be understood that the virtual instructor 507 can be configured in a wide variety of ways. For example, the virtual instructor 507 can be a virtualized representation of a particular person, such as a celebrity or well-known figure, as appropriate for the particular game and/or game move being taught in the tutorial or sequence played in the game. Moreover, if the player 501 properly mimics (or fails to properly mimic), the virtual instructor 507 can be configured to provide verbal feedback (either positive or negative) and/or speed up and slow down in the movements taught, or points could be added or deducted from the player's score if during actual game play.

As described herein, it will be further appreciated that although the virtual instructor 507 has been largely described herein as being presented within the context of a tutorial, the virtual instructor 507 could be brought up within the game environment on demand and/or hidden and/or resized and the like throughout the game experience. For example, if an experienced player encounters difficulty with a particular move, even the experienced player may desire to have the virtual instructor 507 perform the exemplary movement such that the experienced player can practice and master the movement. Thus, the virtual instructor 507 can be brought up, manipulated and/or hidden via a menu choice within the game.

In brief recapitulation, embodiments of the invention provide a virtual instructor that is much more advanced than currently available game tutorial systems. According to various embodiments of the invention, the virtual instructor is configured to appear in the display screen of a gaming system next to a player avatar, and to progress through game movements in an interactive way such that the player is enabled to mimic the movements of the virtual instructor and/or play along with the virtual instructor and follow the progress on screen.

It should be understood that although specific examples, such as dance movements, have been shown and described herein, the described specific embodiments of the invention are not intended to be limiting on the scope of the claimed embodiments of the invention. Thus, suitable alternatives are considered to fall within the scope and spirit of this disclosure. For example, the virtual instructor can be configured to perform a pre-prepared sports movement, such as a golf swing or basketball shot, in addition to the dance moves examples explicitly described herein.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
    a gaming device having one or more processors and one or more modules of computer program code stored in a non-transitory computer readable medium and executable by the one or more processors, the one or more modules comprising:
    computer program code configured to enable receipt and storage of motion captured data relating to one or more player movements;
    computer program code configured to provide to a display device display instructions corresponding to one or more player avatars according to the received motion captured data relating to one or more player movements;
    computer program code configured to provide to the display device display instructions corresponding to one or more virtual instructors; and
    computer program code configured to compare the motion captured data relating to one or more player movements to one or more virtual instructor movements.

2. The system according to claim 1, wherein the one or more modules further comprise computer program code configured to provide display instructions for real-time display of one or more player avatar movements and the one or more virtual instructor movements on the display device.

3. The system according to claim 1, wherein the one or more modules further comprise computer program code configured to, in response to receiving motion captured data relating to one or more player movements matching a first virtual instructor movement within a predetermined threshold, providing display instructions relating to a second virtual instructor movement to the display device.

4. The system according to claim 3, wherein the predetermined threshold is motion based.

5. The system according to claim 3, wherein the predetermined threshold is time based.

6. The system according to claim 3, wherein the predetermined threshold is both motion based and time based.

7. The system according to claim 1, further comprising a motion capture system configured to capture motion captured data relating to one or more player movements and transmit the motion captured data to the gaming device.

8. The system according to claim 3, wherein the one or more modules further comprise computer program code configured to, in response to receiving motion captured data relating to one or more player movements not matching the first virtual instructor movement within a predetermined threshold, again providing display instructions relating to the first virtual instructor movement to the display device.

9. The system according to claim 1, wherein the virtual instructor movement is a game movement.

10. The system according to claim 1, wherein the virtual instructor movement is a dance game movement.

11. An apparatus comprising:
    one or more processors; and
    one or more non-transitory computer readable storage mediums having computer program instructions embodied therewith, the computer program instructions being executable by the one or more processors and comprising:
    computer program code configured to enable receipt and storage of motion captured data relating to one or more player movements;
    computer program code configured to provide to a display device display instructions corresponding to one or more player avatars according to the received motion captured data relating to one or more player movements;
    computer program code configured to provide to the display device display instructions corresponding to one or more virtual instructors; and
    computer program code configured to compare the motion captured data relating to one or more player movements to one or more virtual instructor movements.

12. The apparatus according to claim 11, wherein the computer program instructions further comprise computer program code configured to provide display instructions for real-time display of one or more player avatar movements and the one or more virtual instructor movements on the display device.

13. The apparatus according to claim 12, wherein the computer program instructions further comprise computer program code configured to, in response to receiving motion captured data relating to one or more player movements matching a first virtual instructor movement within a predetermined threshold, providing display instructions relating to a second virtual instructor movement to the display device.

14. The apparatus according to claim 13, wherein the predetermined threshold is motion based.

15. The apparatus according to claim 13, wherein the predetermined threshold is time based.

16. The apparatus according to claim 13, wherein the predetermined threshold is both motion based and time based.

17. The apparatus according to claim 11, wherein the computer program instructions further comprise computer program code configured to, in response to receiving motion captured data relating to one or more player movements not matching the first virtual instructor movement within a predetermined threshold, again providing display instructions relating to the first virtual instructor movement to the display device.

18. The system according to claim 11, wherein the virtual instructor movement is a game movement.

19. The system according to claim 11, wherein the virtual instructor movement is a dance game movement.

20. A computer program product comprising:
    a non-transitory computer readable storage medium having computer readable program code embodied therewith, the computer readable program code comprising:
    computer program code configured to enable receipt and storage of motion captured data relating to one or more player movements;
    computer program code configured to provide to a display device display instructions corresponding to one or more player avatars according to the received motion captured data relating to one or more player movements;
    computer program code configured to provide to the display device display instructions corresponding to one or more virtual instructors; and
    computer program code configured to compare the motion captured data relating to one or more player movements to one or more virtual instructor movements.

* * * * *